United States Patent
Carter (10) Patent No.: US 7,992,481 B2
(45) Date of Patent: Aug. 9, 2011

(54) PANEL CUTTING APPARATUS

(76) Inventor: Ronald Carter, Philadelphia, PA (US)

( * ) Notice: Subject to any disclaimer, the term of this patent is extended or adjusted under 35 U.S.C. 154(b) by 755 days.

(21) Appl. No.: 11/983,326

(22) Filed: Nov. 8, 2007

(65) Prior Publication Data

US 2009/0120257 A1    May 14, 2009

(51) Int. Cl.
*B26D 7/04* (2006.01)
(52) U.S. Cl. .................. 83/745; 83/574; 83/614
(58) Field of Classification Search .......... 83/520, 83/521, 522.19, 574, 614, 485, 745, 471.2, 83/471.3; 33/286, 645, 677, DIG. 21, 638; 144/286.1, 286.5, 287
See application file for complete search history.

(56) References Cited

U.S. PATENT DOCUMENTS

| | | | | |
|---|---|---|---|---|
| 3,287,808 A * | 11/1966 | Fortune | .................. | 33/32.3 |
| 3,634,975 A * | 1/1972 | Hensley | .................. | 451/127 |
| 4,905,745 A * | 3/1990 | Jaeger | .................. | 144/144.51 |
| 4,947,910 A * | 8/1990 | Reneau | .................. | 144/371 |
| 5,379,815 A * | 1/1995 | Brazell et al. | .................. | 144/287 |
| 5,385,183 A * | 1/1995 | Ferranti | .................. | 144/144.51 |
| 5,664,612 A * | 9/1997 | Klemma | .................. | 144/286.1 |
| 5,868,054 A * | 2/1999 | Chubb et al. | .................. | 83/522.18 |
| 6,079,309 A * | 6/2000 | Molburg | .................. | 83/745 |
| 6,851,345 B1 * | 2/2005 | Kennelly et al. | .................. | 83/438 |
| 6,868,612 B2 * | 3/2005 | Ballard | .................. | 30/371 |
| 7,162,809 B2 * | 1/2007 | Haas et al. | .................. | 33/640 |
| 7,373,732 B2 * | 5/2008 | Baida | .................. | 33/640 |
| 7,779,737 B2 * | 8/2010 | Newman et al. | .................. | 83/485 |
| 2005/0223862 A1 * | 10/2005 | Oberheim | .................. | 83/477.2 |

* cited by examiner

*Primary Examiner* — Laura M. Lee
(74) *Attorney, Agent, or Firm* — Eugene E. Renz, Jr.

(57) ABSTRACT

A panel cutting apparatus is disclosed. The apparatus comprises a bench and a rail mounted to the bench, and adapted to guide a saw along the rail. A bench aligner displays a visual indication of a desired cut line of said workpiece. A positioning guide allows for convenient repositioning of a workpiece, allowing a user to make accurate, repeatable cuts in a workpiece, such as a panel material or sheet of plywood.

5 Claims, 9 Drawing Sheets

Figure 1:
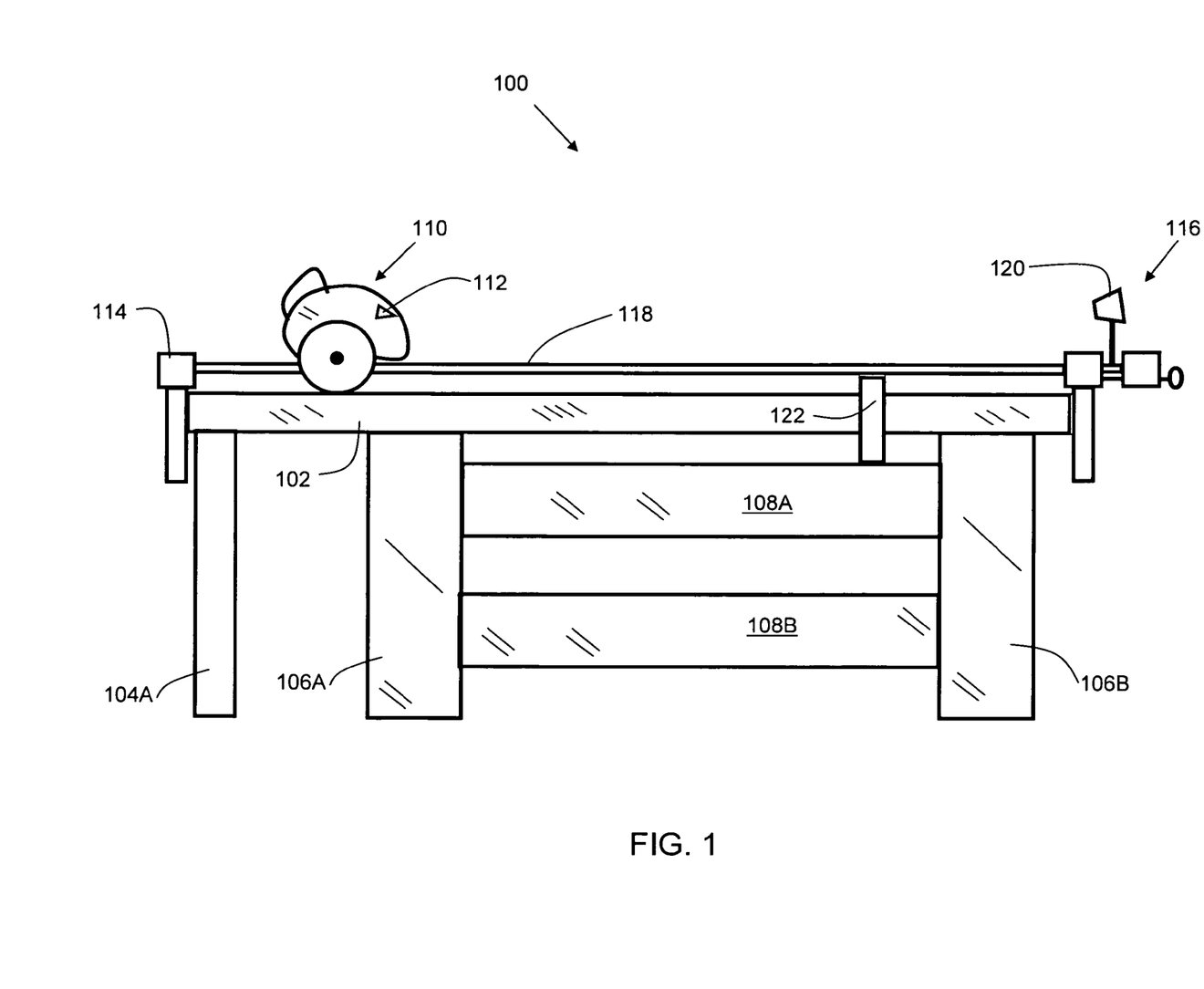
FIG. 1 shows a side view of an exemplary embodiment of the present invention.

FIG. 7D ary embodiment of the present invention. This embodiment comprises a bench 102 which is supported by a plurality of main legs (106A and 106B are visible in this drawing), and a plurality of rear support legs (104A is visible in this drawing). Two horizontal supports 108A and 108B provide additional stability to the panel saw apparatus 100. A saw 110 travels in a linear fashion along a rail 118. In an exemplary embodiment, the saw is a circular saw. However, other types of saw may be used, such as a jig saw with a reciprocating blade. The saw 110 has an alignment device 112, which may be an optical alignment device, such as a laser device, or other device capable of producing a thin, visible line, such as a beam of light, or a shadow. Alignment device 112 is also referred to as the saw alignment device. In an alternative embodiment, the alignment device 112 may be a visible mark on the saw 110 that is disposed along the cut line of the saw.

The rail 118 is suspended by rear rail mount 114 and front rail mount 116. The height of the rail 118 above bench 102 is adjustable to accommodate panels of various thicknesses. A second alignment device 120 is mounted on the apparatus 100. Alignment device 120 is also referred to as the bench aligner. The position of alignment device 120 is adjustable, and as part of the initial setup of the apparatus, is adjusted to project a visual indication (such as a laser beam) along the cutting path of saw 110. In this particular embodiment, second alignment device is mounted on the front rail mount 116. A positioning guide 122 may optionally be used to aid in positioning a workpiece on the apparatus 100 in order to be cut.

Figure 2:
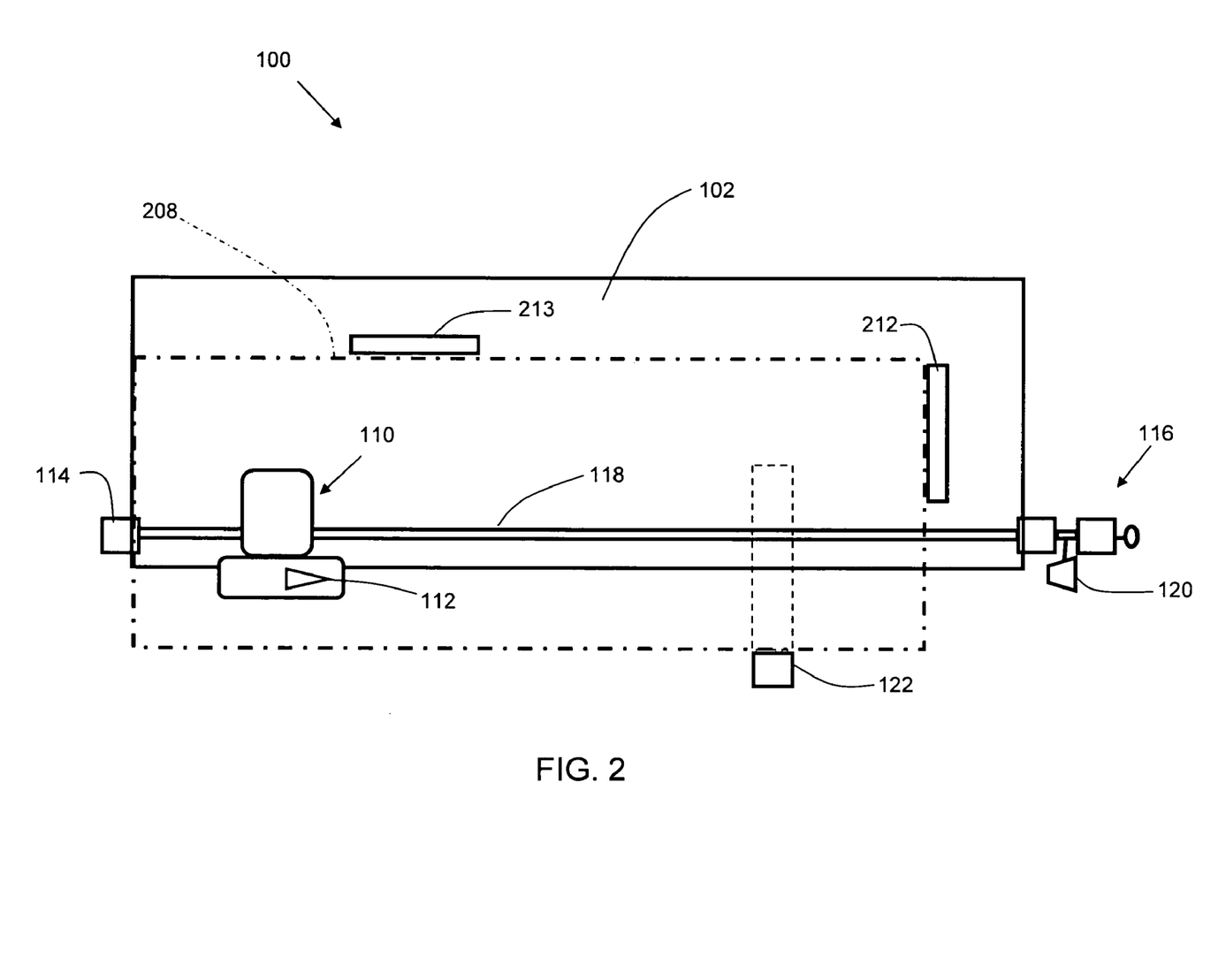
FIG. 2 shows a top view of an exemplary embodiment of the present invention.

FIG. 2 shows a top view of the embodiment of FIG. 1. In this drawing, a workpiece 208 (also referred to as a "panel") is shown in phantom lines to indicate how a panel is placed on the panel saw apparatus 100. The panel saw has clamping means 212 and 213 to help secure the workpiece 208 prior to cutting it.

Figure 3:
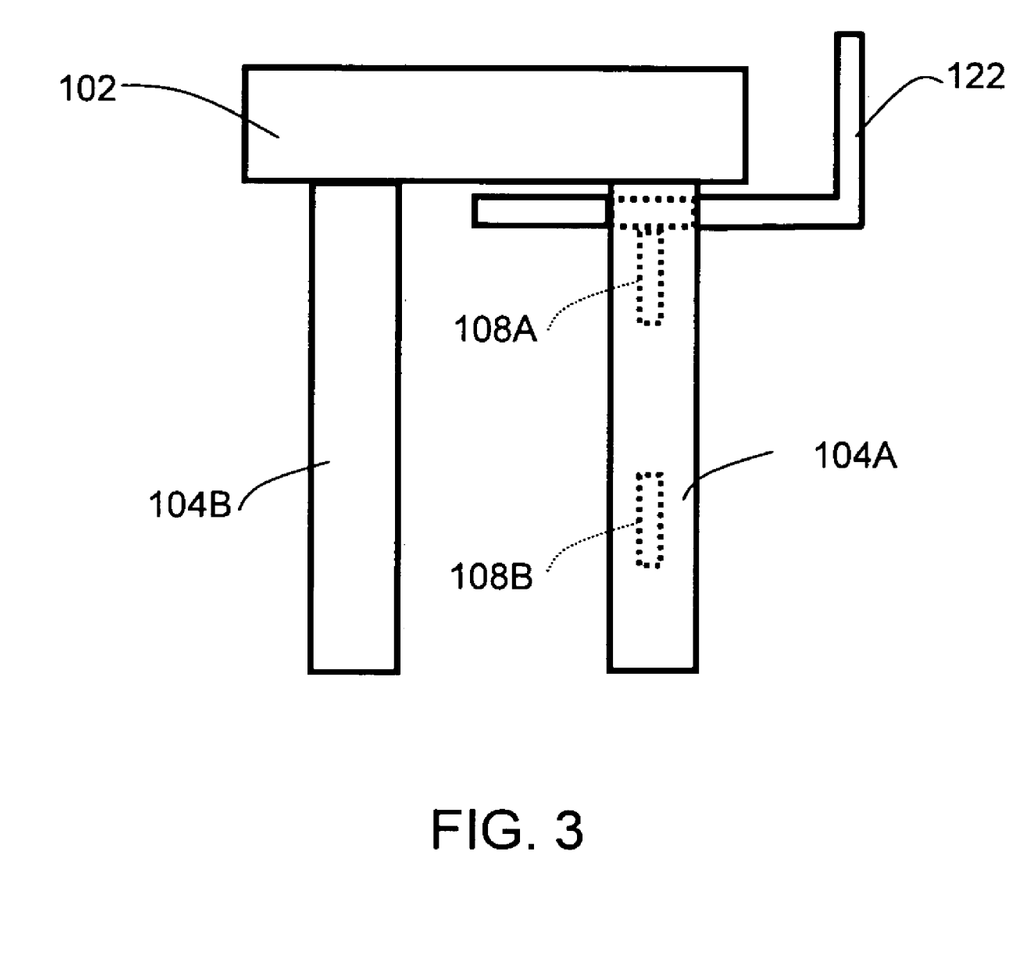
FIG. 3 shows another side view of an exemplary embodiment of the present invention, indicating the positioning guide.

FIG. 3 shows another side view of an exemplary embodiment of the present invention, indicating the positioning guide. For clarity, not all parts are illustrated in this drawing. In this view, the positioning guide 122 of this embodiment is shown as a generally L-shaped part mounted underneath bench 102. The highest part of positioning guide 122 exceeds the level of the bench, thereby serving to guide a workpiece to a desired position to be cut. It is used to aid in positioning the workpiece prior to cutting it.

Figure 4:
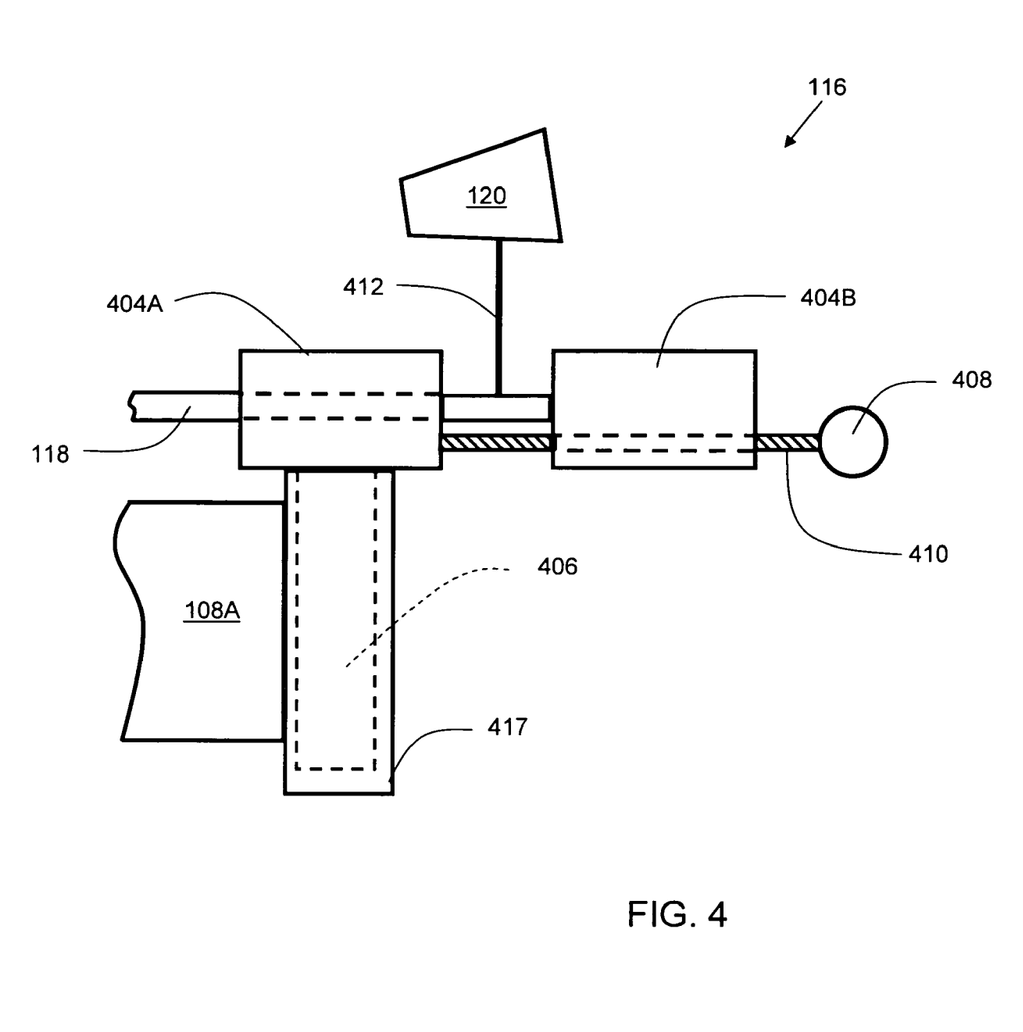
FIG. 4 shows detail of a tensioning mechanism used in an embodiment of the present invention.

FIG. 4 shows detail of a tensioning mechanism used with front rail mount 116 used in an embodiment of the present invention. Rail 118 traverses block 404A and is attached to block 404B. Threaded shaft 410 traverses block 404B, and is connected to knob 408. When knob 408 is turned in a clock-

PANEL CUTTING APPARATUS

FIELD OF THE INVENTION

This invention relates to the field of hand-operated construction equipment, and more particularly to a method and apparatus for cutting building material.

BACKGROUND

During the construction of wooden structures, it is often necessary to use a relatively large amount of lumber or other panel material. For example, lumber may be typically used to form both interior and exterior walls of buildings and houses, and may also be used to fabricate forms which are used when pouring concrete foundations. In addition, lumber is used in siding, wooden decks or porches, wooden floors, and cabinets. Because lumber is typically purchased in predetermined lengths, it is often necessary to repeatedly cut lumber to form one of the aforementioned structures.

Because lumber is relatively heavy and bulky, it is often difficult to uniformly cut the lumber such that the cut is straight and in a direction which is substantially perpendicular to the length of the lumber. The reason for this difficulty is that a relatively large effort is required to repeatedly position an often long piece of lumber each time a cut is to be made. In addition, it is often difficult to position and secure a piece of lumber with one hand, and accurately position a hand-held electrically operated circular saw with the other hand. These problems are compounded by the fact that circular saws are relatively difficult to control with one hand while lumber is being cut. Furthermore, certain types of woodworking, such as cabinetmaking, require very precise cuts which can be difficult to achieve with a hand-held saw.

While the use of table saws and panel saws may overcome some of these problems, they are often of little use to the craftsman who may find it virtually impossible to repeatedly transport these heavy pieces of equipment to different job sites. These saws typically require a considerable amount of floor space, since the panels are moved against a stationary saw blade. Accordingly, there is a need for a relatively portable and compact device which enables the craftsman to conveniently make precise, uniform cuts in panel material.

SUMMARY OF THE INVENTION

The present invention addresses the aforementioned problems by adapting a hand-held saw to travel in a linear path on a bench, constrained by a guide means. An alignment system allows a workpiece (e.g. a sheet of plywood) to be aligned with the saw along a desired cut line. A clamping mechanism secures the workpiece to a bench. An adjustable positioning guide allows the workpiece to be quickly moved to a new position for subsequent "repetitive" cuts, facilitating an efficient way to cut a workpiece into multiple pieces, each of approximately the same dimensions. For example, an 4×8 foot sheet of plywood could be quickly cut into 8 strips, each strip being 6 inches wide and 8 feet long. The present invention provides a way to accurately and conveniently make precise, uniform cuts in panel material. It also allows for large panels to be cut in a relatively confined area such as a basement or garage of a residential home.

DETAILED DESCRIPTION

FIG. 1 shows a side view of an exemplary embodiment of a panel cutting apparatus 100 of the present invention. This wise direction, it forces threaded shaft 410 against block 404A, thereby inducing tension in rail 118. This improves the accuracy of the cuts, as it reduces the amount of free play of the saw 110 (FIG. 1) during a cut. The tension allows rail 118 to have a smaller diameter and still be effective. In a preferred embodiment, the rail diameter is in the range from about 1 inch to about 2 inches.

Block 404A has post 406 that inserts into shaft 417. Shaft 417 is mounted to support 108A. The post and shaft arrangement provides a mechanism for adjusting the height of rail 118 above bench 102 (FIG. 1). Preferably, post 406 is sized such that it forms a "friction fit" with shaft 417. That is, there is sufficient friction such that the shaft will remain at the position to which it is inserted, allowing it to be securely fastened in place with a bolt or other fastener (not shown). Rear rail mount 114 also has a similar post and shaft mechanism to also be adjusted to the appropriate height.

In this embodiment, alignment bracket 412 supports alignment device 120. In one embodiment, alignment device 120 is a STRAIT-LINE LASER LEVEL, marketed by NEWELL RUBBERMAID, INC, of Freeport, Ill.

Figure 5:
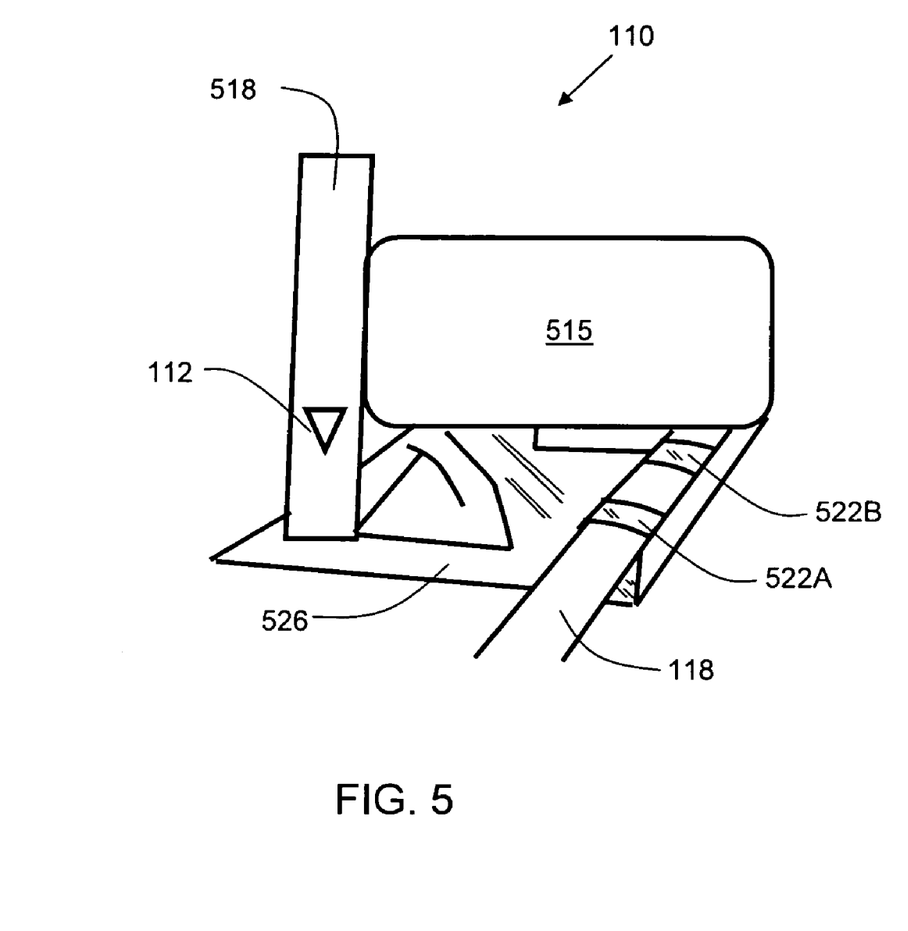
FIG. 5 shows detail of a saw and guide used in an embodiment of the present invention.

FIG. 5 shows detail of a saw and guide used in an embodiment of the present invention. Saw 110 is comprised of a motor portion 510, and blade assembly 518. Alignment device 112 is mounted on the blade assembly 518. Motor portion 510 and blade assembly 518 are affixed to base 526. In this embodiment, rail 118 is cylindrical, and resembles a segment of pipe. Base 526 is secured to rail 118 via bushings 522A and 522B. Bushings 522A and 522B keep the saw 110 attached to rail 118 while still allowing travel along the elongated direction of the rail. It is also contemplated that the rail may have other embodiments, such as a track with integrated bearings.

Figure 6:
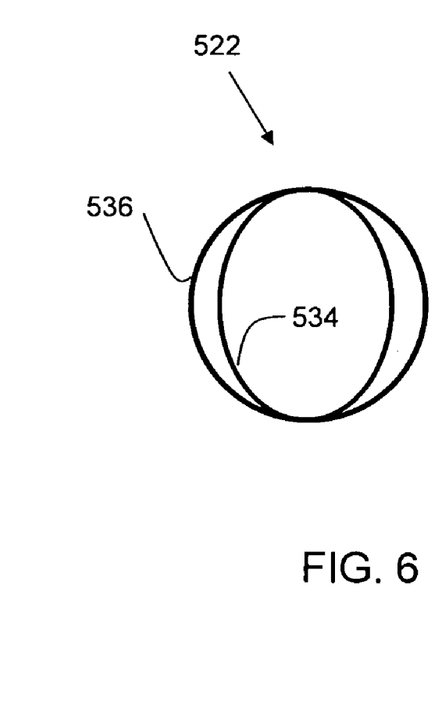
FIG. 6 shows a cross section of a guide bushing used in an embodiment of the present invention.

FIG. 6 shows a cross section of a guide bushing 522 used in an embodiment of the present invention having a cylindrical rail such as described previously. The guide bushing 522 is comprised of an inner ring 534 circumscribed by outer ring 536. Inner ring 534 is preferably elliptical in shape, whereas outer ring 536 is substantially circular. The narrower part of the inner ring 534 is oriented such that it is positioned above rail 118. The inventor has found that this arrangement, combined with the tensioning mechanism described in FIG. 4, provides for reduced play of the saw 110 as it travels along rail 118.

Figure 7A:
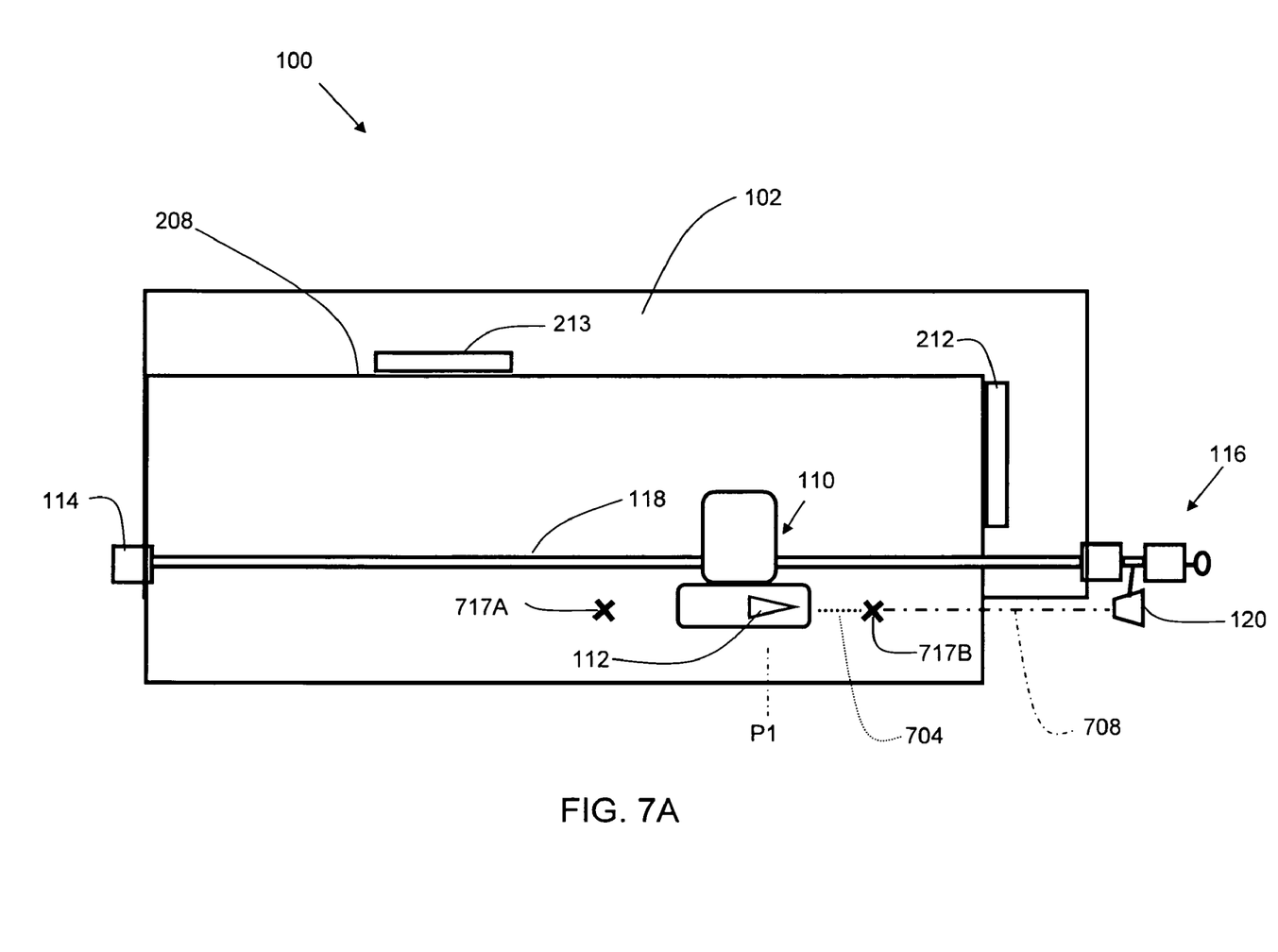
FIGS. 7A-7D show a method of calibrating and using an exemplary embodiment of the present invention.
Figure 7B:
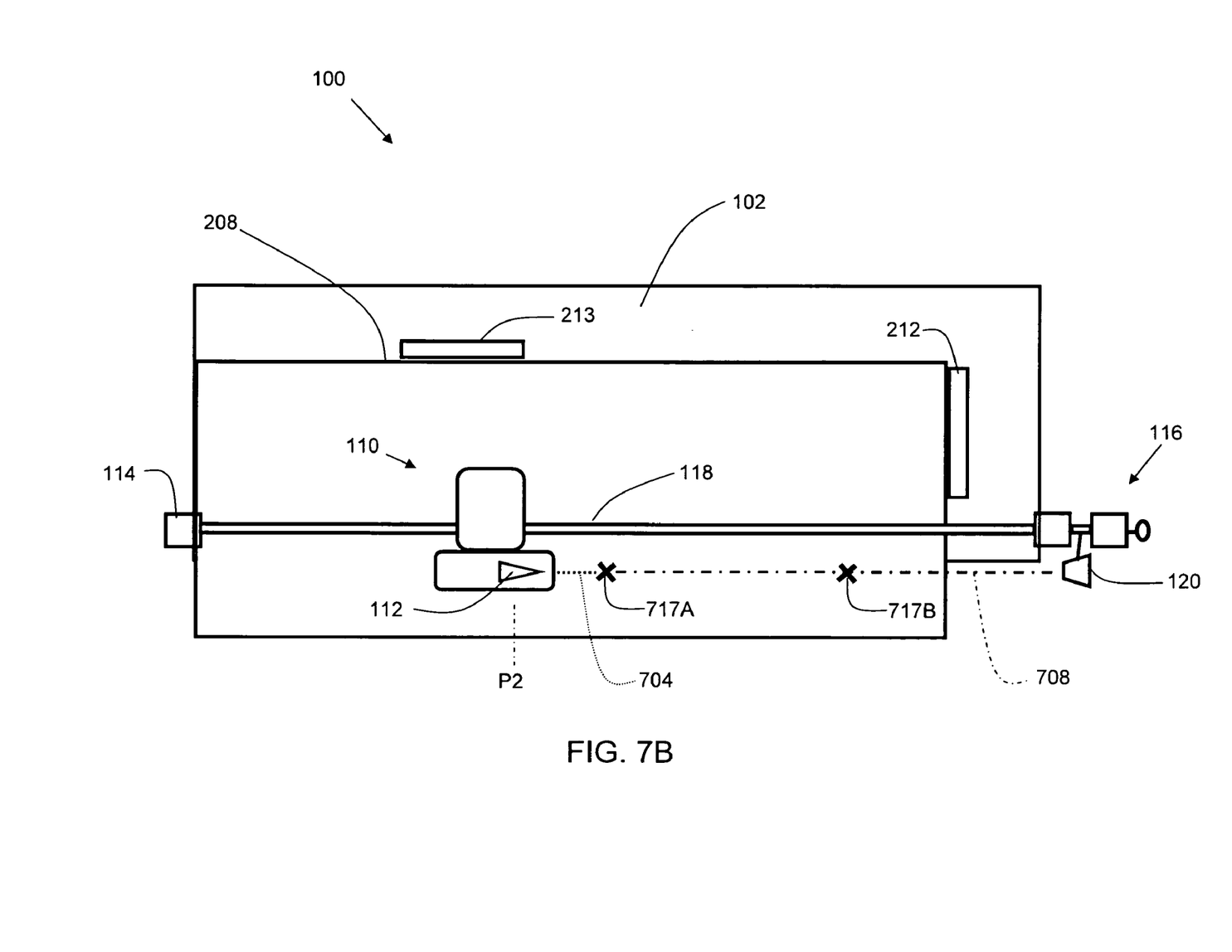

FIGS. 7A-7D show a method of calibrating and using an exemplary embodiment of the present invention. FIGS. 7A-7D are all top views. FIGS. 7A and 7B show calibration steps. A workpiece 208 is inserted into the apparatus 100 and secured via clamping means 212 and 213. The workpiece is optionally marked with at least two points (717A and 717B) lying along the desired cut line (not shown), using a pencil, or other suitable marking device.

The saw 110 is moved to a first position P1 which is relatively close to alignment device 120. In one embodiment, alignment device 112 on saw 110 produces a visible indication 704 (e.g. a laser line), and alignment device 120 produces visible indication 708 which may be another laser line. Indications 704 and 708 should line up as shown in FIG. 7A, and also align with the point 717B marked along the desired cut line of workpiece 208. This process is repeated at position P2 (see FIG. 7B) where P2 is further away from alignment device 120 than position P1, and is checked against point 717A. This ensures that the path of the saw aligns with the desired cut line on the workpiece 208, and that the visible indication from alignment device 120 is aligned with both points (717A and 717B), and hence, aligned with the desired cut line.

Figure 7C:
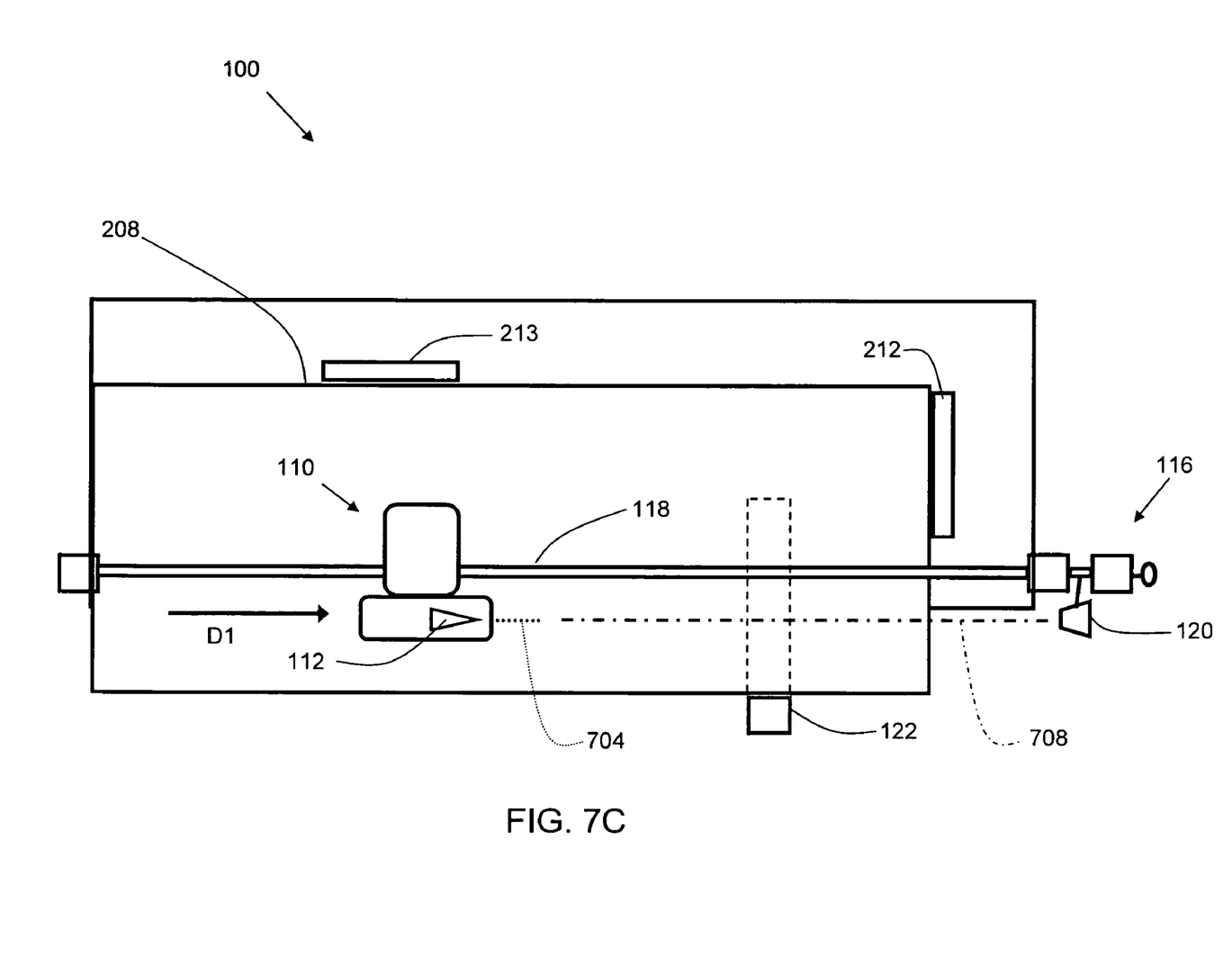
Figure 7D:
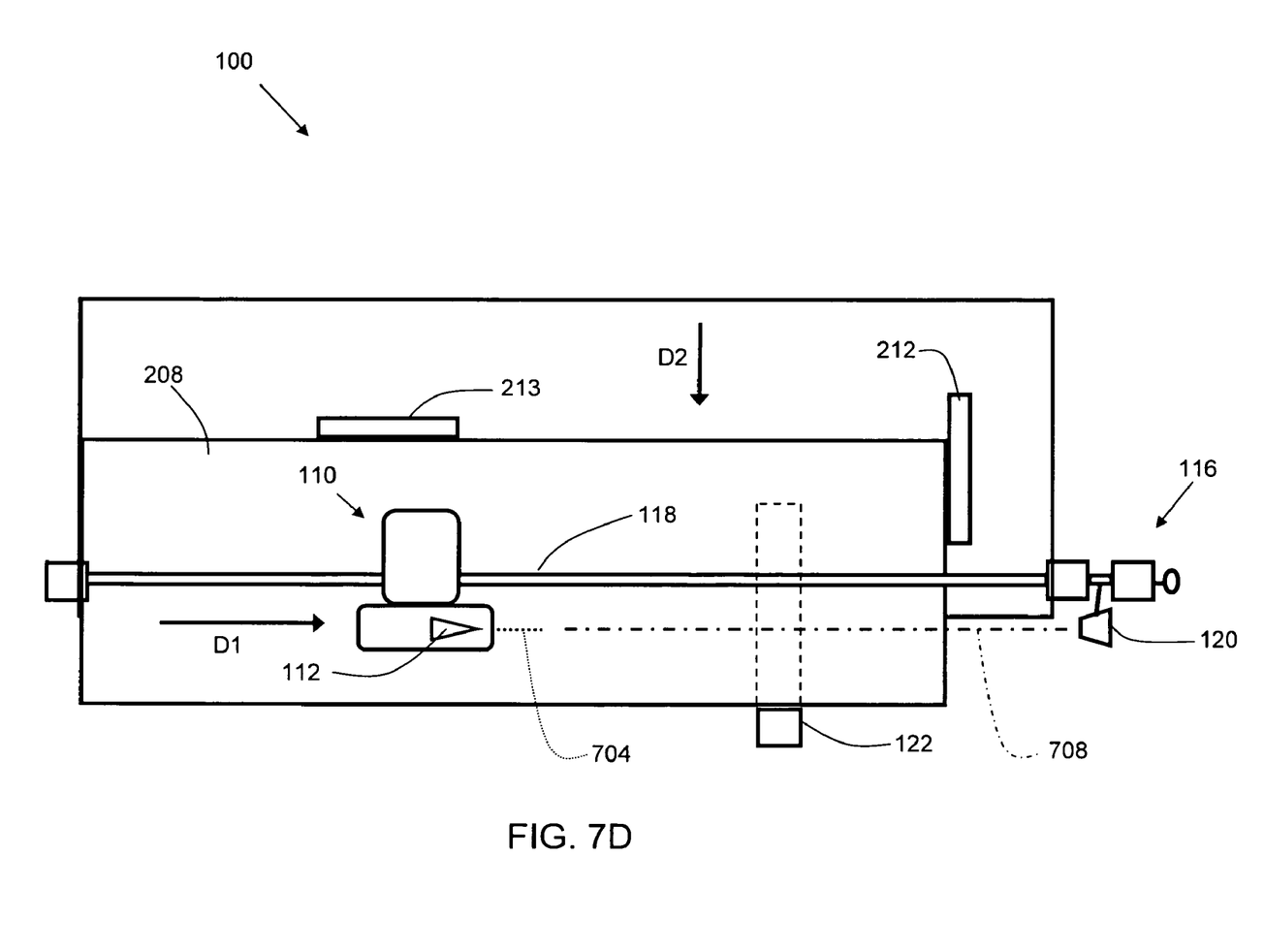

FIGS. 7C and 7D show a method of using the present invention. In FIG. 7C, workpiece 208 is cut by moving saw 110 to a starting position, and operating the saw 110 in the direction D1, as indicated by the referenced arrow until the saw reaches a finishing position, at which point the cut is complete. The workpiece is secured adjacent to positioning guide 122. When the cut is complete, the workpiece is moved so it once again is adjacent to positioning guide 122. FIG. 7D indicates the second cut, where the workpiece has been moved in direction D2 after completion of the previous cut. Subsequent cuts of similar dimensions can be easily made by continuing to move the workpiece in the direction D2 after the completion of a cut, and then moving the saw in direction D1 to complete the next cut.

It will be understood that the present invention may have various other embodiments. Furthermore, while the form of the invention herein shown and described constitutes a preferred embodiment of the invention, it is not intended to illustrate all possible forms thereof. It will also be understood that the words used are words of description rather than limitation, and that various changes may be made without departing from the spirit and scope of the invention disclosed. Thus, the scope of the invention should be determined by the appended claims and their legal equivalents, rather than solely by the examples given.

What is claimed is:

1. A panel cutting apparatus comprising:
   a bench and a saw, the bench comprising a plurality of legs oriented vertically, and a plurality of horizontal supports disposed between, and secured to, the plurality of legs;
   a cylindrical rail mounted to said bench;
   a post receptacle affixed to one of the plurality of horizontal supports at one end;
   a tensioning mechanism, said tensioning mechanism comprising;
   a first block and a second block;
   wherein said rail traverses the first block, and is attached to the second block; and a threaded shaft, said threaded shaft traversing the second block;
   wherein the second block further comprises a post, the post configured and disposed to enter the post receptacle, thereby securing the second block to the bench;
   wherein the threaded shaft is configured and disposed to rotate, thereby exerting force on the second block, thereby inducing tension in the rail, wherein said saw comprises at least one bushing adapted to traverse said rail so that the saw is movable along said rail, wherein said bushing comprises an inner elliptical ring, said inner elliptical ring circumscribed by a circular outer ring.

2. The apparatus of claim 1, wherein said saw comprises a saw alignment device, the saw being configured and disposed to travel in a linear path along said rail.

3. The apparatus of claim 2, wherein said saw is a circular saw.

4. The apparatus of claim 1, further comprising a clamping means adapted to secure a workpiece to said bench.

5. The apparatus of claim 4, further comprising:
   a bench aligner, said bench aligner adjustably mounted to said bench, said bench aligner configured and disposed to display a visual indication of a desired cut line of said workpiece.

* * * * *